(12) United States Patent
Horvitz

(10) Patent No.: US 6,999,955 B1
(45) Date of Patent: Feb. 14, 2006

(54) SYSTEMS AND METHODS FOR ESTIMATING AND INTEGRATING MEASURES OF HUMAN COGNITIVE LOAD INTO THE BEHAVIOR OF COMPUTATIONAL APPLICATIONS AND SERVICES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/186,135

(22) Filed: Jun. 28, 2002

Related U.S. Application Data

(63) Continuation-in-part of application No. 09/313,090, filed on May 17, 1999, now Pat. No. 6,415,304, and a continuation-in-part of application No. 09/295,077, filed on Apr. 20, 1999, now Pat. No. 6,581,050.

(51) Int. Cl.
 *G06N 5/00* (2006.01)
(52) U.S. Cl. .......................... 706/45; 706/47
(58) Field of Classification Search ................. 702/57; 706/10, 45; 114/382; 700/47
See application file for complete search history.

(56) References Cited

U.S. PATENT DOCUMENTS

| | | | |
|---|---|---|---|
| 4,472,770 A * | 9/1984 | Li ............................... | 700/47 |
| 5,493,692 A | 2/1996 | Theimer et al. | |
| 5,544,321 A | 8/1996 | Theimer et al. | |
| 5,555,376 A | 9/1996 | Theimer et al. | |
| 5,586,218 A | 12/1996 | Allen | |
| 5,603,054 A | 2/1997 | Theimer et al. | |
| 5,611,050 A | 3/1997 | Theimer et al. | |
| 5,727,950 A | 3/1998 | Cook et al. | |
| 5,812,865 A | 9/1998 | Theimer et al. | |
| 5,864,848 A | 1/1999 | Horvitz et al. | |
| 5,867,822 A | 2/1999 | Sankar | |
| 5,948,058 A | 9/1999 | Kudoh et al. | |
| 6,016,478 A | 1/2000 | Zhang et al. | |
| 6,047,260 A | 4/2000 | Levinson | |
| 6,055,513 A | 4/2000 | Katz et al. | |
| 6,080,202 A | 6/2000 | Strickland et al. | |

(Continued)

OTHER PUBLICATIONS

U.S. Appl. No. 09/192,001, filed Nov. 13, 1998, Confidence Measure.

(Continued)

*Primary Examiner*—Wilbert L. Starks, Jr.
(74) *Attorney, Agent, or Firm*—Amin & Turocy, LLP

(57) ABSTRACT

The present invention relates to a system and methodology for extending and making more appropriate the interactive decisions made by automated services by taking into consideration estimates of the time required by users for the cognitive processing of problems, visualizations, and content based on several factors, including the competency and familiarity of the user with the output and nature of the sequences of output, the complexity of the output and overall tasks being considered, and the context of the user. The methods allow automated applications to control the rate at which the applications interact with users. Portions of automated services are controlled in view of limited human processor capabilities in design/operation of such services, and/or visualizations/output from the services (e.g., amount of dwell time provided/considered before a next automated sequence is displayed/invoked). Models can be formulated and utilized in conjunction with automated services such as automatically determining and pausing a period of time before a next sequence in a service is enabled or disabled. The models can also be employed to determine multiple dwells for comprehension, as a function of complexity of graphical/conceptual relationships, at different phases of an animation.

43 Claims, 12 Drawing Sheets

U.S. PATENT DOCUMENTS

| | | | |
|---|---|---|---|
| 6,101,480 | A | 8/2000 | Conmy et al. |
| 6,134,548 | A | 10/2000 | Gottsman et al. |
| 6,167,567 | A | 12/2000 | Chiles et al. |
| 6,182,118 | B1 | 1/2001 | Finney et al. |
| 6,199,102 | B1 | 3/2001 | Cobb |
| 6,201,948 | B1 | 3/2001 | Cook et al. |
| 6,262,790 | B1 | 7/2001 | Horvitz et al. |
| 6,269,763 | B1 * | 8/2001 | Woodland .................. 114/382 |
| 6,278,996 | B1 | 8/2001 | Richardson et al. |
| 6,317,718 | B1 | 11/2001 | Fano |
| 6,427,063 | B1 | 7/2002 | Cook et al. |
| 6,446,055 | B1 * | 9/2002 | Grand ......................... 706/10 |
| 6,466,232 | B1 | 10/2002 | Newell et al. |
| 6,513,046 | B1 | 1/2003 | Abbott, III et al. |
| 6,549,915 | B1 | 4/2003 | Abbott, III et al. |
| 6,580,417 | B1 * | 6/2003 | Rosenberg et al. ......... 345/157 |
| 6,747,675 | B1 | 6/2004 | Abbott et al. |
| 6,760,669 | B1 * | 7/2004 | Patel et al. .................. 702/57 |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B1 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

U.S. Appl. No. 09/055,477, filed Apr. 6, 1998, Method and Apparatus.

U.S. Appl. No. 08/684,003, filed Jul. 19, 1996, Intelligent User Assistant.

U.S. Appl. No. 09/197,159, filed Nov. 20, 1998, Intelligent User Assistant.

U.S. Appl. No. 09/197,158, filed Nov. 20, 1998, Intelligent User Assistant.

U.S. Appl. No. 09/197,160, filed Nov. 20, 1998, Intelligent User Assistant.

Turpenein, Marko et al, Agent-Meditated Personalized Multimedia Services, http://www.cs.hut.fi/~mtu/diplomityo. html, created May 22, 1995, download, May 19, 2003, 1326 Hours, pp.: 1-65.

Miao, Cunyan et al, A Dynamic Inference Model for Intelligent Agents, International Journal of Software Engineering and Knowledge Engineering, vol. 11, Nov. 5, Jan. 2001, paged 509-528.

Eric Horvitz, Jack Breese, David Heckerman, David Hovel, Koos Rommelse, The Lumiere Project: Bayesian User Modeling for Inferring the Goals and Needs of Software Users, Proceedings of the Fourteenth Conference on Uncertainty in Artificial Intelligence, Madison, WI, Jul. 1998, Morgan Kaufmann Publishers, 10 pages.

David Heckerman and Eric Horvitz, Inferring Informational Goals from Free-Text Queriers: A Bayesian Approach, Proceedings of the Fourteenth Conference on Uncertainty in Artificial Intelligence, Madison, WI, Jul. 1998, Morgan Kaufmann Publishers, 8 pages.

Susan Dumais, John Platt, David Heckerman, Mehran Sahami, Inductive Learning Algorithms and Representations for Text Categorization, Proceedings of ACM-CIKM98, Nov. 1998, 8 pages.

Ben Shneiderman, Pattie Maes, Direct Manipulation vs Interface Agents: Excerpts from debates at IUI 97 and CHI 97, Interactions, Nov.-Dec. 1997, pp. 42-61.

M. Sahami, S. Dumais, D. Heckerman, E. Horvitz, A. Bayesian Approach to Filtering Junk E-Mail, AAAI Workshop on Text Classification, Jul. 1998, Madison, Wisconsin, AAAI Technical Report WS-98-05, 8 pages.

Microsoft Press Computer Dictionary, Microsoft Press, Third Edition, p. 403.

Judea Pearl, Probabilistic Reasoning in Intelligent Systems: Networks of Plausable Inference (ISBN 1558604790) Apr. 1.

Eric Horvitz, Matthew Barry, Display Information for Time-Critical Decision-Making, Proceeds of the Eleventh Conference on Uncertainty in Artificial Intelligence, Montreal, Aug. 1995, 10 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265—No. 3.

* cited by examiner

SYSTEMS AND METHODS FOR ESTIMATING AND INTEGRATING MEASURES OF HUMAN COGNITIVE LOAD INTO THE BEHAVIOR OF COMPUTATIONAL APPLICATIONS AND SERVICES

RELATED APPLICATIONS

This application is a continuation-in-part of the coassigned application entitled "Waiting Prior to Engaging in Action for Enhancement of Automated Services" filed May 17, 1999, Ser. No. 09/313,090 now U.S. Pat. No. 6,415,304. This application is also a continuation-in-part of the coassigned application entitled "Learning by Observing a User's Activity for Enhancing the Provision of Automated Services" Ser. No. 09/295,077, filed on Apr. 20, 1999, now U.S. Pat. No. 6,581,050 and is related to the coassigned and copending applications entitled "A Decision-Theoretic Approach to Harnessing Text Classification for Guiding Automated Action" Ser. No. 09/295,088, filed on Apr. 23, 1999, and "Systems and Methods for Directing Automated Services for Messaging and Scheduling" Ser. No. 09/295,146, filed on Apr. 23, 1999, both of which are hereby incorporated by reference.

FIELD OF THE INVENTION

This invention relates generally to automated services, and more particularly to cognitive processing by users based on their review, understanding, deliberative problem solving, and/or memory retrieval during performance of such services for enhancement thereof.

BACKGROUND OF THE INVENTION

Computer applications such as messaging and scheduling applications have become important applications in many computer users' lives. Messaging programs generally allow a user to send and receive electronic mail (e.g., messages) to and from other computer users, for example, over a local- or a wide-area network, or over an intranet, extranet, or the Internet. Scheduling programs generally allow a user to track appointments in a calendar. More sophisticated scheduling programs allow one user to schedule a group meeting with other computer users—checking the latter users' schedule availability, and receiving confirmation from the users upon them accepting or rejecting the group meeting appointment.

Within the prior art, however, messaging and scheduling programs are generally not very well integrated, even if they are components within the same computer program. For example, a user may receive a message from a colleague stating "Looking forward to seeing you at 2 p.m. on Thursday." Generally, however, the prior art does not provide for automatically directing the scheduling program to make a meeting appointment at 2 p.m. on Thursday. Instead, typically the user who has received the message has to open the scheduling program, access Thursday's calendar, and manually enter an appointment at 2 p.m. on Thursday's calendar. Because of the many steps required to go from reading the message within the messaging program to entering the information into the scheduling program, many users choose not to even use scheduling programs, or to only use them sparingly.

In another regard, people exploit a variety of cognitive facilities to make sense of the world. Over the last century, cognitive psychologists have demonstrated that both sequential and parallel processing capabilities are employed in analyzing, learning, and understanding sensory information and conceptual relationships. A variety of findings have focused on the limited abilities of people to integrate, remember, process and understand numerous objects, concepts, and relationships.

One of the promises of modern computing has been to develop and leverage new graphics rendering technologies to enhance the understanding of complex relationships via visualization. Visualization of complex relationships can provide significant utility in education, for example, allowing students to push toward the limits of their understanding, and to bolster the abilities of both information workers and more typical consumers of personal computing, thus facilitating more complex tasks with new found efficiency.

To date, some researchers have leveraged prior results and new work in cognitive psychology in a variety of ways to enhance visualization of and navigation in complex information spaces. However, most work in the creation of graphical visualizations or other automated applications has remained in the realm of handcrafted design by experts.

SUMMARY OF THE INVENTION

The present invention relates to a system and methodology to facilitate cognitive processing in automated applications by controlling the rate at which the applications generate results, provide visualizations, and, more generally, interact with users. In general, it has been determined that humans have limited cognitive processing capabilities when interacting with automated systems and thus, often require time to efficiently process different items, results, and/or partial results from computer-related interactions, in the course of carrying out tasks. In one aspect of the present invention, portions of automated services are controlled in view of limited human processor capabilities in design/operation of such services, and/or visualizations/output from the services (e.g., amount of dwell time provided/considered before a next automated sequence is displayed/invoked). Models can be formulated and utilized in conjunction with automated services such as automatically determining and pausing a period of time before a next sequence in a service is enabled or disabled (e.g., controlling visual presentations, controlling interactivity with applications such as e-mail, calendar services, web services). These models can consider an ideal (or suitable) comprehension time as a function of: the nature and complexity of the items or results at a user's focus of attention, an environmental and/or work context (e.g., is the user alert and time-pressured, are there distractions, is the work-load high in general, and so forth), background knowledge of the user (e.g., can shorten dwell times in an animated visualization as the user may be familiar with the data structure, general sequence, and/or sub-parts of the animation), and the overall competency of the user with regards to the item or result at the focus of attention. The models can also be employed to determine multiple dwells for comprehension, as a function of complexity of graphical/conceptual relationships, at different phases of an animation.

In another aspect of the present invention, automated processes are provided that can guide the design, sequencing, and temporal dynamics of visualizations and/or control interactions with other automated services. Thus, automated machinery can be constructed on principles of animation dynamics or other considerations developed in accordance with modeled understandings of the abilities and limitations of people to comprehend time-based sequences of visual/ audio/symbolic information that form complex relationships over time. Such modeling can also consider pre-existing data relating to suitable time required to integrate information regarding visual or conceptual relationships associated with static and animated sequences of visual information—as a function of complexity and/or familiarity of the views being presented, for example. In addition, other aspects control and optimize a dwell or multiple dwell duration and speed of animations by linking rate of an unfolding of a transformation of an object or of a shift of viewpoint as a function of a complexity of the object, animation and/or familiarity. Complexity can be automatically computed as a function of the number of objects and relations being introduced and manipulated, for example. Familiarity can be a separate measure or can be folded into a normalized complexity measure—yielding an "effective complexity," that is, complexity normalized by familiarity.

Another aspect of the present invention relates to waiting prior to engaging an automated service, for enhancement thereof. In one embodiment, a computer-implemented method first determines an automated service to be performed. The method waits a predetermined time between a minimum time and a maximum time, before performing the automated service. In one embodiment, the method determines the predetermined time by performing a statistical regression as to the predetermined time that should be waited based on a length of a received text.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
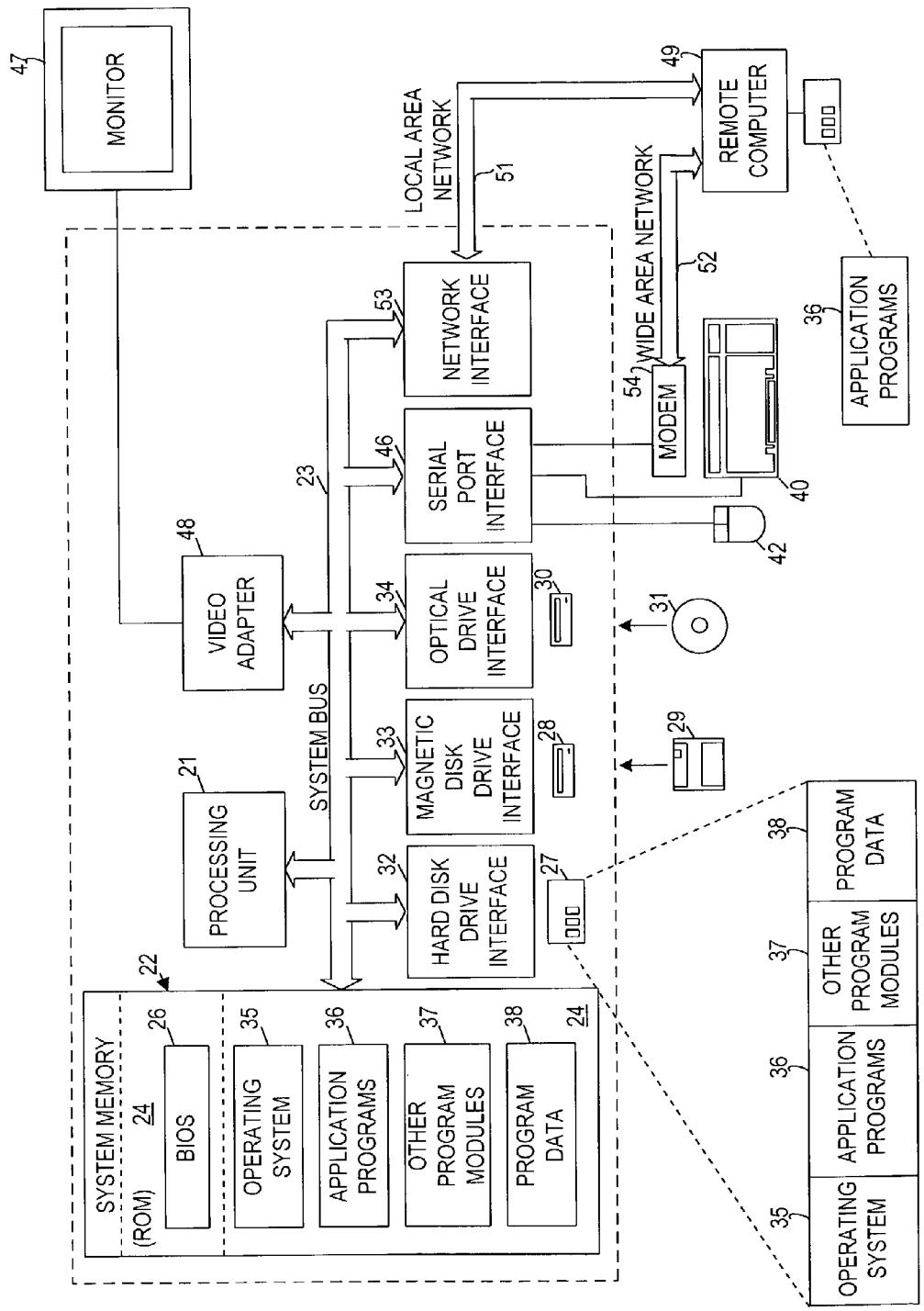
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof may be stored in the remote memory storage device. It is appreciated that the network connections shown are exemplary and other means of and communications devices for establishing a communications link between the computers may be used.

ILLUSTRATIVE EXAMPLE

Figure 2:
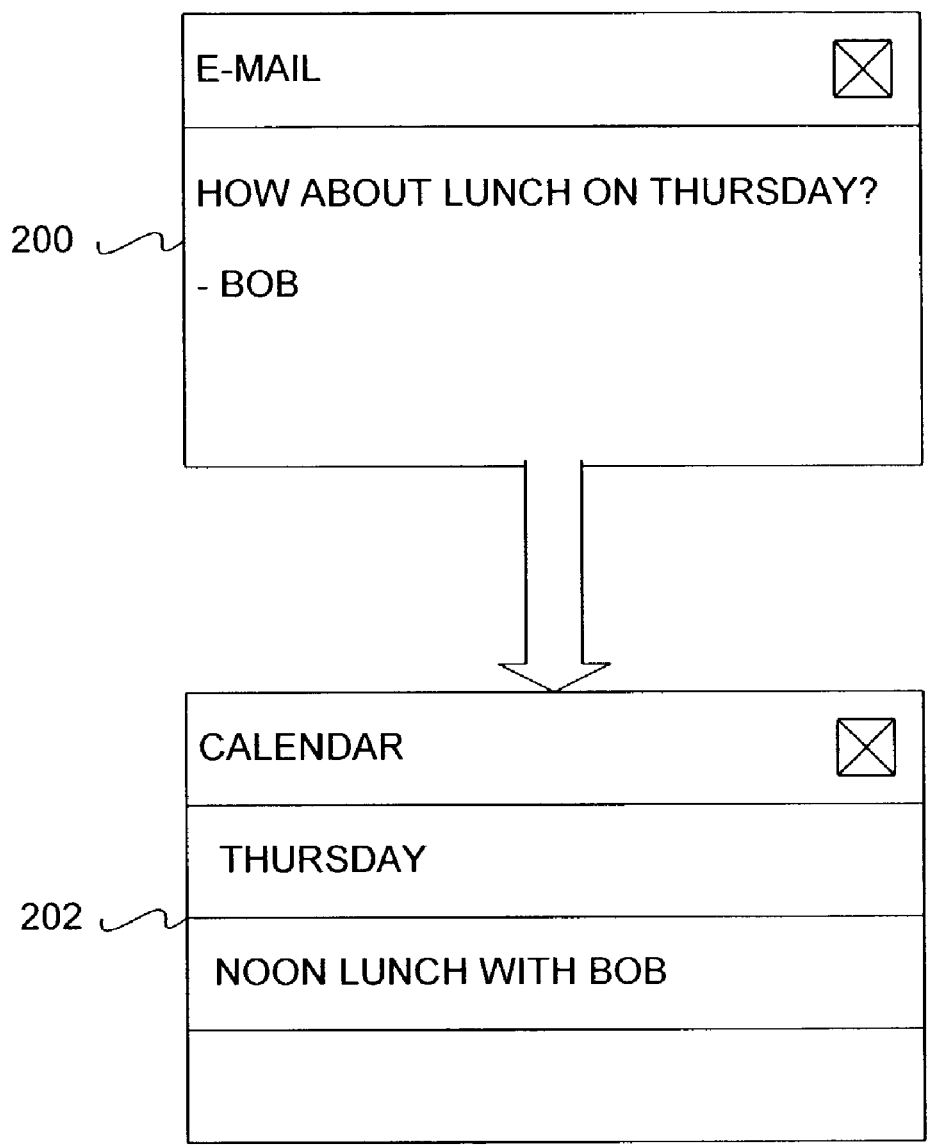
FIG. 2 is a diagram of an example of directed scheduling, according to an embodiment of the invention.

Prior to describing methods and systems of embodiments of the invention, an illustrative example according to an embodiment of the invention is first described in this section of the detailed description, with reference to FIG. 2. As stated in the summary, embodiments of the invention are not limited to any particular application. For example, in different embodiments of the invention, such applications include scheduling appointments, scoping calendars to appropriate ranges, forwarding messages, and sending various alerts to user. The example described in this section specifically relates to directing automated services for messaging and scheduling. Thus, in the example of FIG. 2, an electronic mail is shown in a window 200. The window 200 may be part of an electronic mail program, such as those available within the art. The electronic mail has the text, from a user named Bob, reading "How about lunch on Thursday?". In one embodiment of the invention, a window 202 of the scheduling program appears, such as scheduling programs available within the art. The embodiment of the invention causes a scheduling entry to be entered in the user's calendar for Thursday, at noon, reading "Lunch with Bob." Attempts are made to place the meeting as close to noon as possible but also checking in reasonable hours for lunch before and after noon if something already on the schedule encroaches on the 12:00 pm–1 pm schedule slot.

In other words, the embodiment of the invention of FIG. 2 determines the action probability of the text of the electronic mail in the window 200, and makes a decision for automatic scheduling based on the probability of the message. It then performs a scheduling action—parsing the text of the electronic message, and entering the entry in the scheduling program as is shown in the window 202. Thus, the embodiment of the invention is able to recognize that "Lunch" means about noon in time, and that "lunch on Thursday" sent from a single user to a single recipient is associated with a relatively high probability that the user will have the goal of wishing to review an online calendar or schedule an appointment (that is, a high probability that the electronic mail will stimulate a goal of calendar review or scheduling).

Those of ordinary skill within the art can appreciate that the example of FIG. 2 is meant only to illustrate how embodiments of the invention can operate, for purposes of understanding operation of embodiments of the invention, and does not represent limitations of the invention itself.

Methods

In this section of the detailed description, computer-implemented methods according to varying embodiments of the invention are described. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
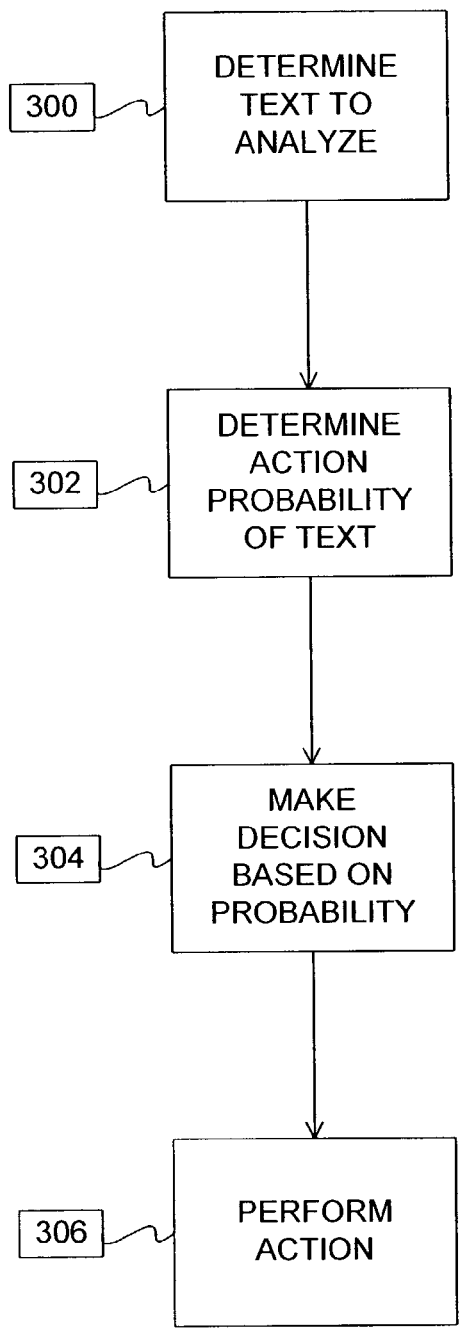
FIG. 3 is a flowchart of a method according to an embodiment of the invention.

A general method of an embodiment of the invention is first described in conjunction with FIG. 3, which is a flowchart of a method according to an embodiment of the invention. In 300, the method specifically determines a text to analyze. For example, the text can be a message of an electronic mail program that currently has focus. A message having focus is the message of the window that is currently open within a graphical user interface operating system. For example, ten windows may be open on the screen, such that each window has an electronic mail message therein. The window that is currently selected by the user is the window that is currently active, and thus the window that has focus. It is this window that the method selects in 300 in one embodiment of the invention, although the invention is not so limited. As another example, the text to be analyzed can be user input—for example, by the user copying or cutting text to a clipboard, as known within the art, and then invoking 300 of the method based on this text. The invention is not so limited.

In 302, the method next determines an action probability based on the text. The action probability of the text generally refers to the probability that the text relates to an action task. For example, in the context of scheduling programs, in general, a message reading "Good luck, Bob, on your new venture" has a low action probability, since it does not have subject matter relating to a scheduling task. Conversely, for example, in the context of scheduling programs, in general, a message reading "The next departmental meeting will be held at 5 on October 23" has a high action probability, since it does have subject matter relating to a scheduling task.

In other words, the action probability of a text is the probability that the user's goal for the text is to perform an action based on the message. In one embodiment of the invention, the action probability is determined in 302 by passing the text as input to a model such as a text classification system. Text classification systems are based on technologies for classifying objects based on attributes, including Support Vector Machines, decision trees, and combinations. In particular, in one embodiment of the invention, the model utilized is as described in U.S. Pat. No. 5,864,848, issued Jan. 26, 1999, which is hereby incorporated by reference. In another embodiment of the invention, the model utilized is as described in the previously filed and coassigned case entitled "METHODS AND APPARATUS FOR BUILDING A SUPPORT VECTOR MACHINE CLASSIFIER," Ser. No. 09/055,477, filed on Apr. 6, 1998, which is also hereby incorporated by reference. In addition, further information regarding the training of these models for the particular application in this case is later described in this application.

Once the action probability of the text has been determined in 302, then in 304, the method makes a decision based on the probability. More specifically, the method selects one of three options. First, the method can select inaction that is, not to perform any action based on the message. Second, the method can select action, but with user approval—that is, to perform an action based on the text, but only after receiving confirmation from the user that the method should go ahead and perform the action. Third, the method can select automatic action—that is, to perform an action based on the text, automatically, without first receiving confirmation from the user.

In one embodiment of the invention, the method determines which of the three options to select based on probability thresholds associated with the boundaries among the three options. A first probability threshold is associated with the inaction\action with user approval boundary, and a second probability threshold is associated with the action with user approval\automatic action boundary. If the action probability is less than the first probability threshold, then the method selects inaction. If the action probability is greater than the first probability threshold but less than the second probability threshold, then the method selects action with user approval. Finally, if the action probability is greater than the second probability threshold, then the method selects automatic action.

An example is illustrative in understanding the probability thresholds. For example, the first probability threshold can be 0.4, while the second probability threshold can be 0.7. If a text has an action probability of 0.6, then the method selects action with user approval. In general, the inaction option relates to texts not having subject matter with high action probabilities; the action with user approval option relates to texts having subject matter with medium action probabilities; and, the automatic action option relates to texts having subject matter with high action probabilities.

The invention is not limited as to the manner by which the probability thresholds are determined. In one embodiment, they are user set. For example, with respect to the second probability threshold, the user may be suspicious of automatic action, and thus not want automatic action to occur unless the text being analyzed has a very high action probability, say over 90%. Conversely, for example, a user becoming more accustomed and trusting of automatic action may not want to be bothered with confirming suggested actions, and thus may set the second probability threshold to 70%, which means that texts having probability thresholds over 70% are automatically scheduled.

In other embodiments of the invention, the probability thresholds of the boundaries among the options that can be selected by the method are set in accordance with decision theory, such as utilizing cost/benefit analysis, both of which are known within the art, to provide for contextual and changing probability thresholds. This is described in the coassigned and copending case entitled "A Decision-Theoretic Approach to Harnessing Text Classification for Guiding Automated Action" Ser. No. 09/295,088, which has already been incorporated by reference.

Finally, in 306, the method performs an action based on the decision made in 304. That is, if automatic action was selected in 304, or if action with user approval was selected in 304 and actual user approval was received, then in 306 the action is performed. Conversely, if inaction was selected in 304, or if action with user approval was selected in 304 and actual user approval was not received, then in 306 no action is performed. The invention is not limited to a particular action or set of actions. Examples of actions that are amenable to the invention include scheduling appointments, scoping of calendars to appropriate ranges, forwarding messages, and sending various alerts to users; other examples include extracting a sender's address and contact information, forwarding, paging, routing and moving of or based on texts such as electronic mail messages, as those of ordinary skill within the art can appreciate. In one specific embodiment relating to scheduling appointments, the scheduling action can be performed in a manner balancing precision and confidence of the action, as is particularly described in the copending and coassigned application entitled "Systems and Methods for Directing Automated Services for Messaging and Scheduling" Ser. No. 09/295,146, which has already been incorporated by reference.

Figure 4:
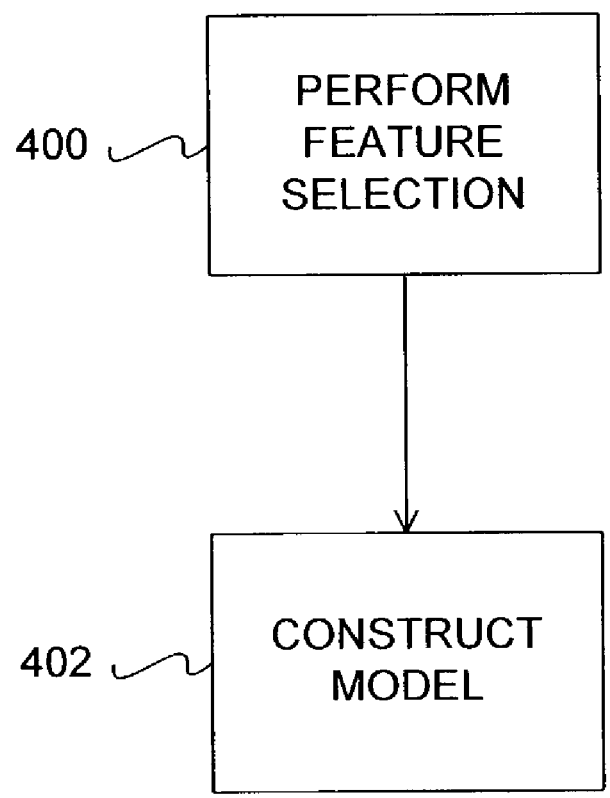
FIG. 4 is a flowchart of a method to construct a model utilized to determine an action probability of a text, according to an embodiment of the invention.

Referring next to FIG. 4, a flowchart of a method to train a text classification system or support vector machine according to an embodiment of the invention, for use in determining an action probability of a message, is shown. For example, the flowchart of FIG. 4 can be used to train a model that is used by 302 of FIG. 3 to determine an action probability of a message. That is, the flowchart of FIG. 4 can be used to initially generate the model used by 302 of FIG. 3. As has been stated, text classification systems and support vector machines are known within the art. Therefore, description of the method of FIG. 4 is specifically geared towards description of adaptation of such models for the applications used herein, as those of ordinary skill within the art can understand.

In 400, a feature selection phase is performed. Feature selection generally is known within the art. The feature selection phase is used to maximally discriminate between text that should be acted upon, and text that should not be acted upon. In one embodiment, this is accomplished by training the model. That is, a number of texts based on which action is to occur (e.g., 500 texts) are input into the feature selection phase, such that the phase knows a priori that the texts are such that action is to occur, and a number of texts based on which action is not to occur (e.g., 500 texts) are input into the feature selection phase, such that the phase knows a priori that the texts are such that action is not to occur. Thus, the model can then determine a maximum discrimination between those texts that are action related, and those texts that are not action related.

In addition, in one embodiment of the invention, feature selection occurs based on an initial seeding with domain-specific knowledge. The domain-specific knowledge can include words and phrases that typically are associated with action-related texts. For example, in the context of scheduling, such words and phrases may include " . . . get lunch," "let's meet," "meet about," etc. A list of such words and phrases that are used in one specific embodiment of the invention in the context of scheduling is provided in the coassigned and copending application entitled "Systems and Methods for Directing Automated Services for Messaging and Scheduling" Ser. No. 09/295,146, which has already been incorporated by reference. Those of ordinary skill within the art understand how such domain-specific knowledge can be used to seed feature selection to provide for maximum discrimination between action-related and non-action-related texts.

Next, in 402, once feature selection has been accomplished in 400, a model-construction phase is performed based on the feature selection. That is a model, such as a text classification system, or a support vector machine, as known within the art, is constructed, based on the feature selection accomplished in 400. The construction of such systems and machines, and such models generally, is known within the art.

Figure 5:
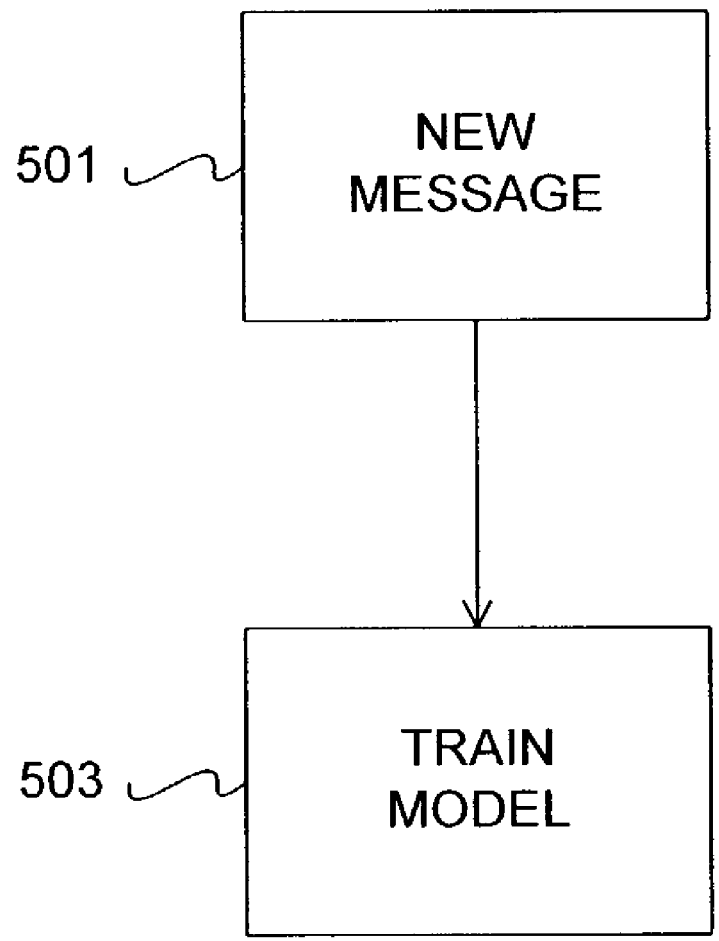
FIG. 5 is a flowchart of a method to train a text classification system according to an embodiment of the invention.

Referring next to FIG. 5, a flowchart of a method for the ongoing training the model, such as the text classification system already described, according to one embodiment of the invention, is shown. The continual training of the method of FIG. 5 can be in one embodiment in addition to the pretraining accomplished in accordance with the method of FIG. 4 that has already been described. The invention is not so limited, however.

In 501, a new message, that is, a new text is received. For example, this corresponds to 300 of FIG. 3 in one embodiment. In 503, the model used to determine action probabilities is trained based on the new text (e.g., the model of 402), in a manner consistent with the original training of the model as previously described, as those of ordinary skill within the art can appreciate. Thus, the prior model is such that a user is continually watched while working with an application, and the model is continually refined by training in the background and being updated in real time for decision making. For each message inputted into the model, a new case for the model is created. The cases are stored as negative and positive examples of texts associated with particular actions or services, such as calendaring or scheduling tasks, for use in training the model, as those of ordinary skill within the art can understand.

In addition, in one embodiment, the action as well as the entire message (text) is stored. If calendaring occurs within a time frame of opening the message, in one mode, or if scheduling occurs whenever a message has focus, in another mode of learning, the message is tagged as a positive instance of being action relevant. In another mode, negative cases are assigned for messages that are not associated with scheduling actions over their history of review. Thus, an automated text classification system based on support vector machines, in one embodiment, is trained in the background based on user preference. In one embodiment, a new model is built in the background based on the earlier and new data set. Based on user preference, the new model can be built in the background, upon exit, per a schedule, per number of new cases, etc. The invention is not so limited.

Learning can occur when the automated services are turned off, or when the service is in use making a stream of ongoing guesses. When the automated system is in use, immediate cancellation of suggestions or actions to display a calendar or schedule an appointment are taken as negative cases. A user's manual actions to review a calendar or to schedule an appointment when the system has not appropriately taken such action are taken as positive examples.

In one embodiment, the set of new cases continues to be appended to previously collected cases. In another embodiment, cases are dropped out as they reach a certain age, when there is sufficient data, keeping the models based on a significant amount of more recent training data.

Data can be stored as the set of cases itself or as an incrementally extended, more compressed index containing the statistics of terms derived from training sets.

Figure 6:
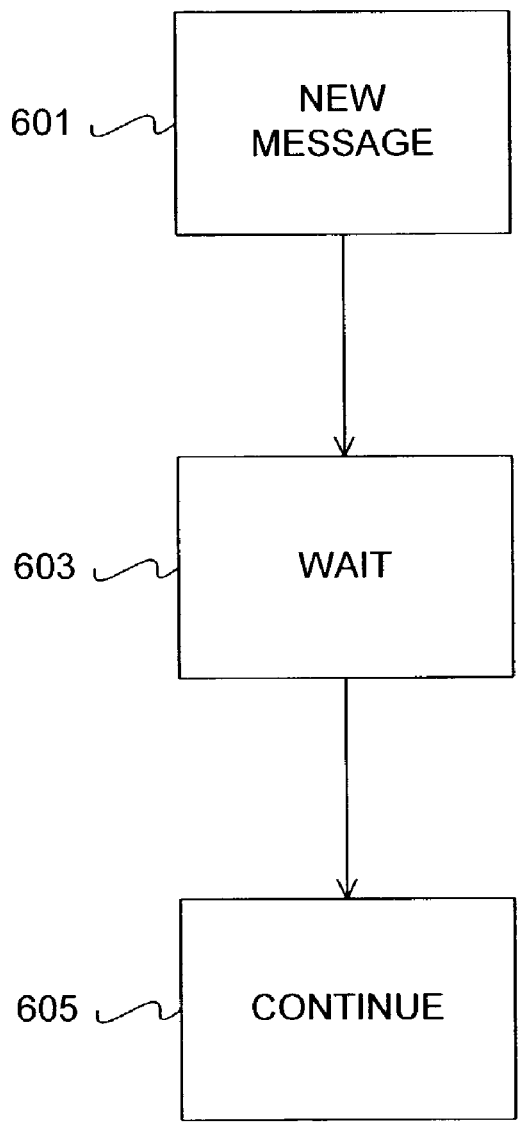
FIG. 6 is a flowchart of a method to wait a predetermined time prior to selecting an option or providing an action, according to an embodiment of the invention.

Referring next to FIG. 6, a method for learning and harnessing the timing of human-computer interactions to guide automated services, according to an embodiment of the invention, is shown. This method is built on the insight that automated service at the wrong time can be costly, and that the value of automated services can be enhanced by learning about the appropriate timing of the service. Thus, in 601, a new message or text is input, corresponding to 300 of the method of FIG. 3. A predetermined time is then waited in 603, and then the method continues in 605. The continuing in 605 can correspond to 302, 304 or 306 of the method of FIG. 3; that is, the waiting of 603 in the context of the method of FIG. 3 occurs after 300 is performed, and before either 302, 304 and 306, in different embodiments of the invention.

Figure 7:
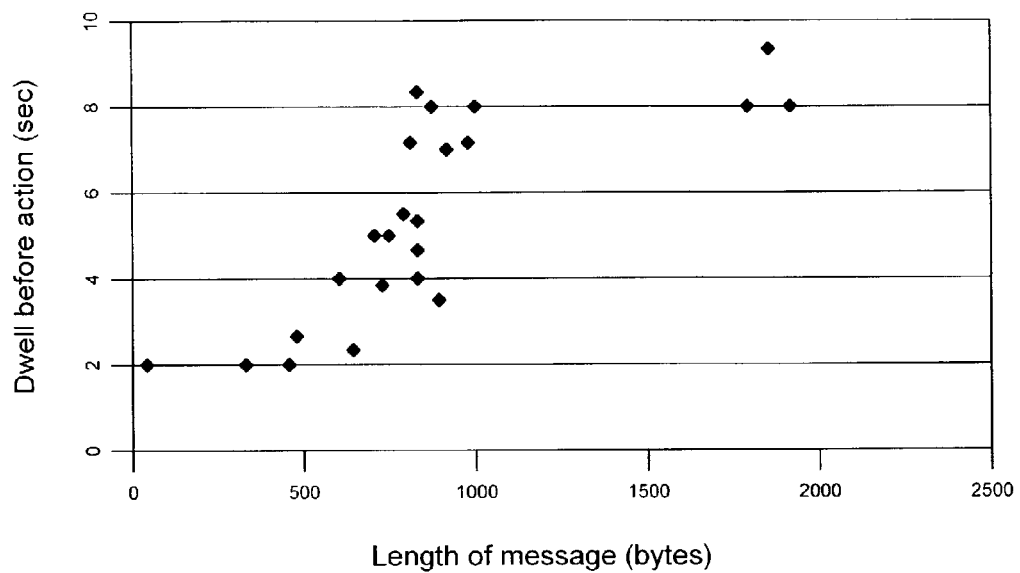
FIG. 7 is a diagram of a statistical regression graph that can be used to determine the predetermined time to wait in accordance with embodiments of the invention; and, FIG. 8 is a diagram of a system according to an embodiment of the invention.
Figure 7:
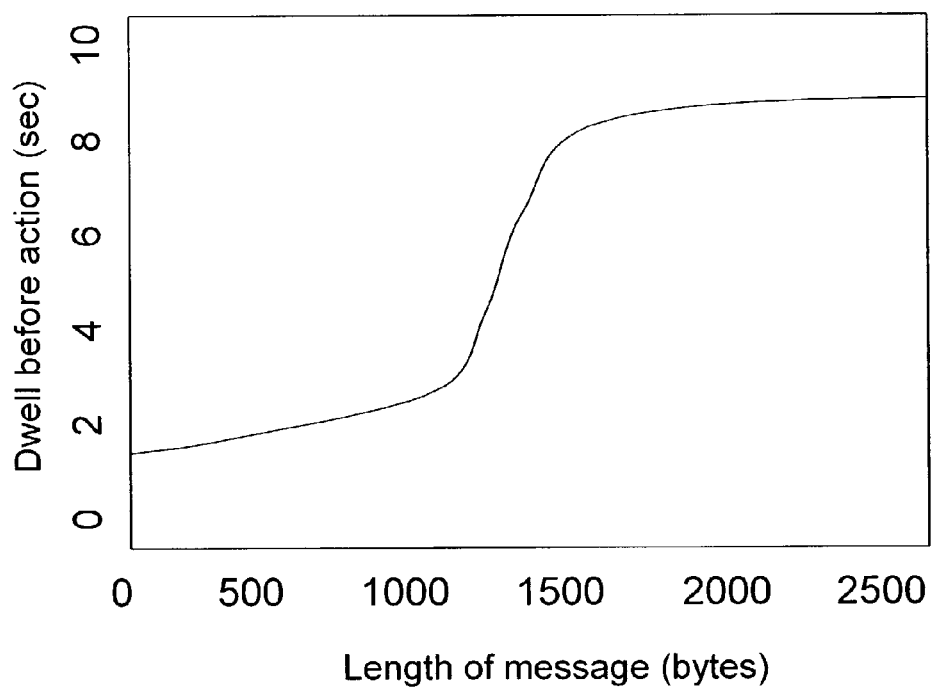

In one embodiment, the predetermined time is determined by performing a statistical regression as to the predetermined time that should be waited, based on the length of each text (message) received. That is, the amount of time that has elapsed between the opening of a message and the invocation of a service or action such as a calendaring operation is stored, as well as any properties of the message. For example, the length of the new portion of each message, as opposed to the long thread of earlier messages to which the message is in reply or extension, can be stored in bytes. Also, the number of dates and times or the location of the first mention of dates and times in the message can be stored. When learning is performed, a statistical regression analysis is employed to determine the most appropriate amount of delay for allowing the user to attend to the message and process the content of the message before distracting the user with services, or a dialog about the services, as a function of message length. An example of a statistical regression for a plurality of messages and their associated predetermined delay times is shown in FIG. 7. Furthermore, in one embodiment, minimum and maximum times for delay are also employed. These can be defined by the user in one embodiment. Linear regression and nonlinear regression methods can be useful. One embodiment uses a non-linear regression model by fitting the data to an S-shaped curve.

In other embodiments of the invention, the time to wait is determined based on a model of one or more of a user's goals, needs, or attention. This model itself can be based on one or more of real-time observations, a saved profile about the user's timing preferences that can be built up over time, or a direct specification from the user. The invention is not so limited, however.

System

Figure 8:
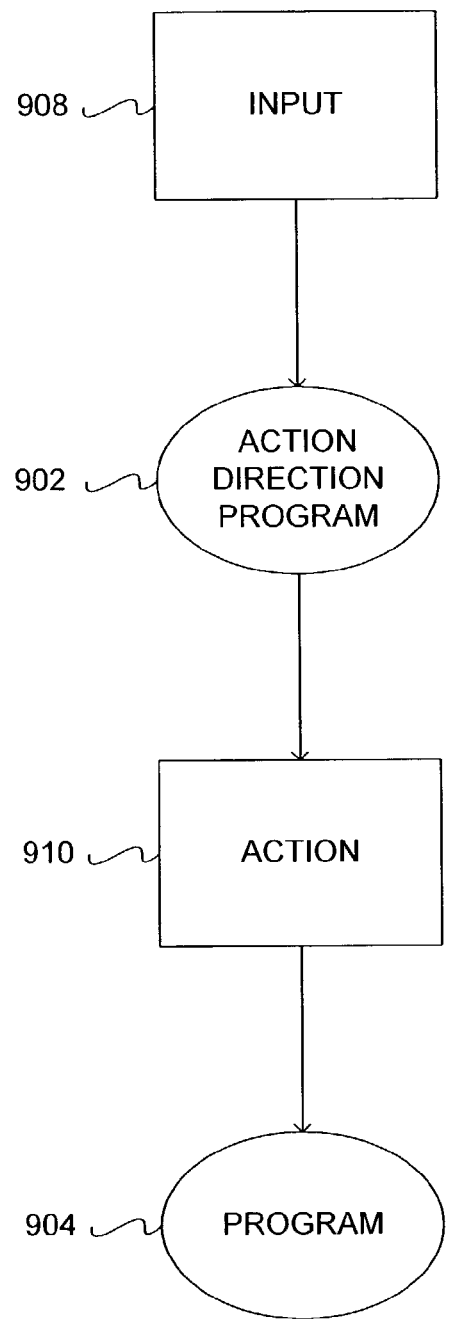

In this section of the detailed description, a system according to an embodiment of the invention is described, in conjunction with FIG. 8. The system of FIG. 8 includes an action direction program 902, and a program 904. In one embodiment, one or more of the programs 902 and 904 is a computer program executed by a processor of a computer (such as the computer described in conjunction with FIG. 1) from a computer-readable medium, such as a memory, of the computer. The action direction program 902 has an input 908, for example, from an electronic mail program (not shown in FIG. 8), or another programs (also not shown in FIG. 8). The action direction program 902 provides an action 910 as an output, which is utilized by the program 904.

The input 908 to the action direction program 902 is in one embodiment text, such as the message of an electronic mail as can be provided by an electronic mail program, although the invention is not so limited. Furthermore, the program 904 is a program that is able to perform the action 910. For example, in one embodiment the program 904 is a scheduling program in which a user is able to track appointments within a calendar, such that the action 910 includes a scheduling action that the scheduling program can act upon (e.g., a specific appointment, etc.). In this example, then, the action direction program 902 is a program in which appointments can be gleaned from the input 908 to be made in conjunction with the scheduling program.

The action direction program 902 first determines an action probability based on the input 908. Based thereon, it selects one of the following three options: (1) inaction, (2) automatic action, and (3) suggested action with user approval. If either option (2) is selected, or option (3) is selected and the user has approved the suggested action, then the action direction program 902 performs an action 910 within the program 904. In one embodiment, this determination of an action probability and the option selection based thereon is made by the program 902 in accordance with the methods previously described, although the invention itself is not necessarily so limited.

In addition, in one embodiment of the invention, the program 902 first initially waits a predetermined time prior to either determining an option, or performing an action or suggestion an action to the user. This can be determined by statistical regression, as has been previously described. Furthermore, in one embodiment of the invention, the program 902 continually trains a text classification system to determine the action probability of the input 908, based on each text (that is, each input) input as the input 908. This is in accordance with continual training as has been already described.

Figure 9:
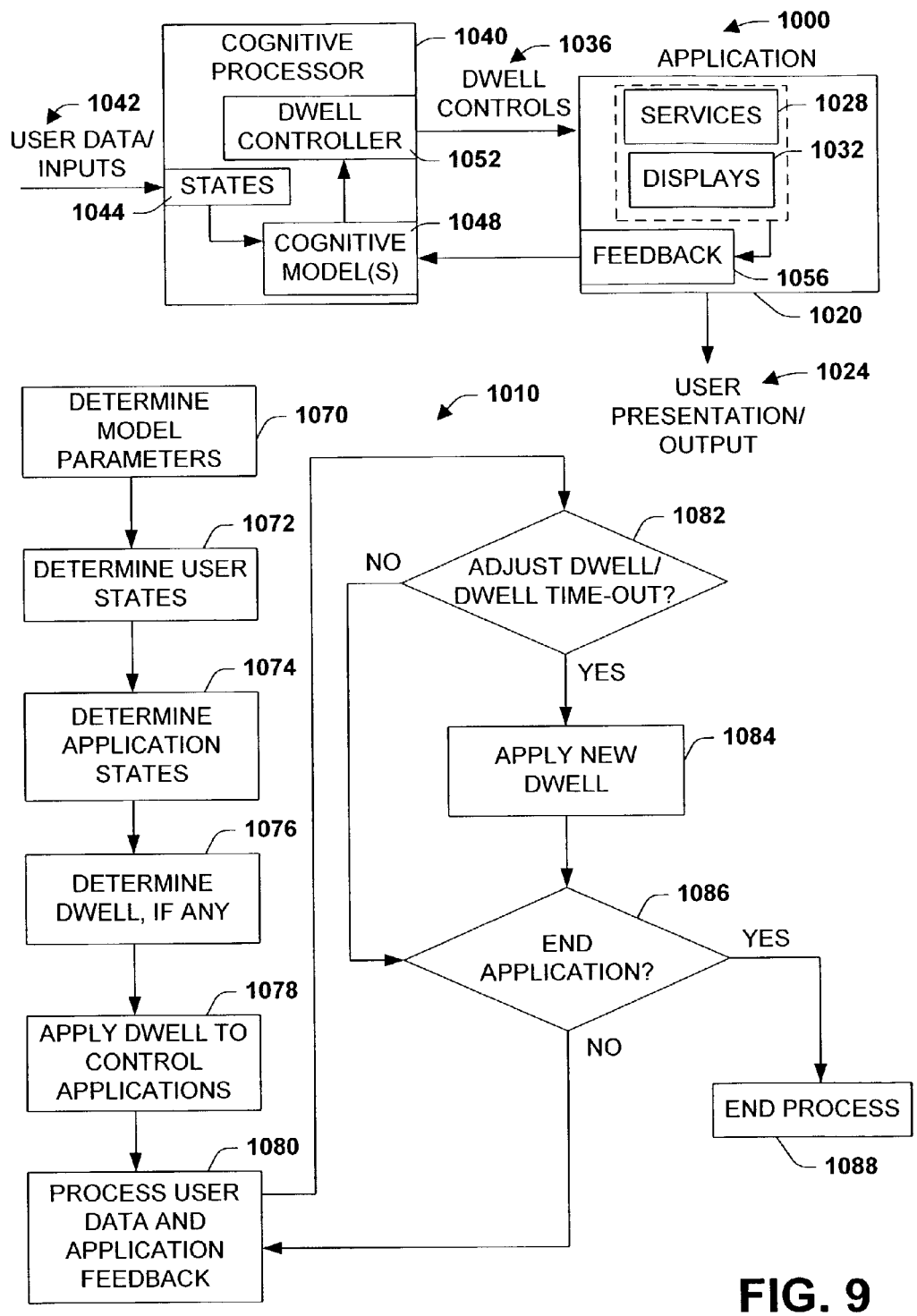
FIG. 9 is a diagram of a system and associated process to facilitate cognitive processing in an automated computing environment in accordance with an aspect of the present invention.

Referring now to FIG. 9, a system 1000 and associated process 1010 illustrate cognitive modeling, processing and controls in accordance with an aspect of the present invention. An application 1020 provides output to a user at 1024 that can include graphical display output, audio output, and/or other type output such as a mechanical indication from a pager or cell phone vibration, for example. The application 1020 can include a plurality of services 1028 and displays 1032 (e.g., e-mail, calendar, desktop services/controls, web services, browsers, animated display sequences, and so forth) executable by a computer. One or more dwell controls 1036 are received from a cognitive processor 1040 to control the rate and/or timing at which the user output 1024 is presented to a user (and/or interacts therewith). The dwell controls 1036 represent codes and/or signals related to timing data (can also include start/stop flags or signals) that is employed by the application 1020 to pause, delay, start, end, and/or restart the associated services 1028 and/or displays 1032.

The cognitive processor 1040 processes user inputs 1042 (or data associated with user such as a user profile, or past activity data) to determine current user states 1044, wherein one or more cognitive models 1048 process the user state information and provide data to a dwell controller 1052. The cognitive models 1048 determine information relating to an ability to process information by the user and are described below. These models 1048 can also process feedback 1056 from the application 1020 indicating a complexity, a number of objects, and object associations between objects, that are currently or about to be processed by the user at 1024 (feedback can include other considerations described below).

The dwell controller 1052 employs processed data or results from the cognitive models 1048 to determine the dwell controls 1036. For example, controls can include formatting timer values or controlling a signal in accordance with determined time values that are larger or smaller depending on the cognitive capabilities of the user. As an example, the cognitive models 1048 may determine that the user processing capabilities have slowed and/or that the complexity served by the application 1020 has increased as indicated by the feedback 1056. In this case, timing values can be dynamically adjusted to slow down the rate at which output 1024 is served to the user. Thus, the dwell controls 1036 act to control the timing of the application 1020 (and/or interaction with application) and ultimately how the application is served, provided, and/or presented to the user. It is noted that the user inputs 1042 can be provided from a plurality of sources such as a keyboard, mouse, microphone, camera, infrared detector, other device and previous computer activities that have been monitored over time (e.g., past applications employed and number of times accessed, speed of interaction with a respective application, and other aspects which provide clues into the cognitive/processing capabilities of the user). Although not shown, the user inputs 1042 can be employed to provide manual indications, selections, and/or dwell/rate adjustments to enable fine-tuning of the automated control processes described herein.

In one aspect of the present invention, portions of the application 1020 are controlled in view of limited human processor capabilities and defined in part by the cognitive models 1048. The models consider and determine one or more parameters or variables such as can be stated broadly by the following expression:

EXAMPLE 1

$C_T = f(C_{P1}, C_{P2} \ldots C_{PN})$, wherein $C_T$ relates to a comprehension time, $f$ is a function, $C_P$ relates to cognitive parameters or variables, and N is an integer. It is noted that the expression in Equation 1 can be employed with substantially any model type or process to determine/predict/infer cognitive capabilities (e.g., probability models, Bayesian inference models, Support Vector Machines (SVM), Naive Bayes, Bayes network, decision tree, similarity-based, vector-based, and/or other learning models or combinations thereof). The comprehension time, $C_T$, is thus employed by the dwell controller 1052 to generate the dwell controls 1036 described above.

A particular example of the expression in Equation 1 can be stated as:

Example 2

$C_T = f(C_C, C_E, C_B, C_O, \ldots)$, wherein $C_C$ relates to a nature and complexity of the items or results at a user's focus of attention, $C_E$ relates to an environmental and/or work context (e.g., is the user alert and time-pressured, are there distractions, is the work-load high in general, and so forth), $C_B$ relates to background knowledge of the user (e.g., can shorten dwell times in an animated visualization as the user may be familiar with the data structure, general sequence, and/or sub-parts of the animation), and $C_O$ relates to the overall competency of the user with regards to the item or result at the focus of attention.

As will be described in more detail below, the models 1048 can also be employed to determine multiple dwells (or dynamically adjustable dwells) for comprehension, as a function of complexity of graphical/conceptual relationships, at different phases of an animation. This can include automated processes that can guide the design, sequencing, and temporal dynamics of visualizations and/or control interactions with other automated services.

In accordance with the cognitive system 1000, an automated process 1010 is illustrated in accordance with the present invention. While, for purposes of simplicity of explanation, the process at 1010 may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1070, one or more cognitive model parameters are determined as described above. At 1072, one or more user states are determined. For example, these determinations can include determining whether the user is busy, intently typing, having a conversation with someone else, how many and what type applications are currently active on desktop, and include inferences about the user's state such as determining the user's goals, attentional resources, and so forth, wherein the inferences are derived in part from the user inputs described above. At 1074, application states are determined. As noted above, feedback can be provided from the application indicating the complexities (and other considerations described below) involved with the current application being accessed by the user. At 1076, based on the modeled parameters, determined user states, and/or application states, an initial dwell data, time or state (e.g. start/stop application flag) is determined by the cognitive model or models. It is noted, that an initial computation for dwell at 1076 may or may not generate an initial delay for an associated interaction with an application.

At 1078, the dwell data is transmitted to an application in order to influence timing or other application dynamic in accordance with the cognitive determinations and states of the user. During the course of a background, foreground, and/or interrupt routine, user input data and/or application feedback can be sampled/processed at 1080 to determine if the user's cognitive capabilities or circumstances have changed over time (e.g., re-compute models periodically). At 1082, a determination is made as to whether to adjust dwell data and/or whether a previous dwell has timed out or no longer in effect. If dwell adjustments are required at 1082, the process proceeds to 1084 and applies new dwell data to the application. If dwell adjustments are not required at 1082, the process proceeds to 1086. At 1086 an end of application determination directs the process to 1088 upon termination of the application or back to 1080 for subsequent sampling and processing—if the application previously controlled by the dwell is still being cognitively processed by the user.

Figure 10:
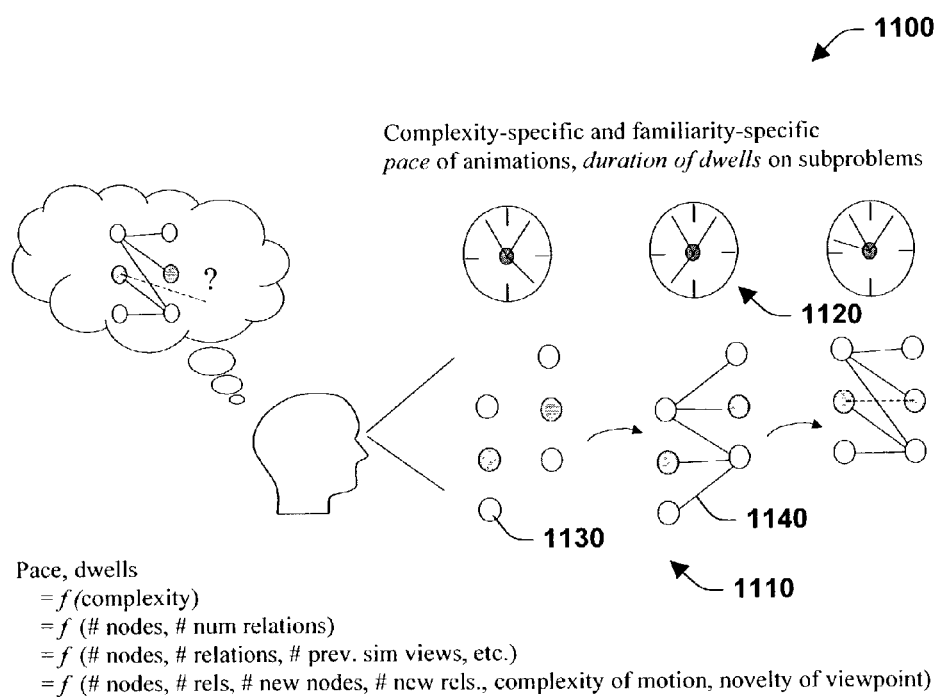
FIGS. 10 through 12 illustrate an aspect of dynamic visualization processing in accordance with an aspect of the present invention.
Figure 11:
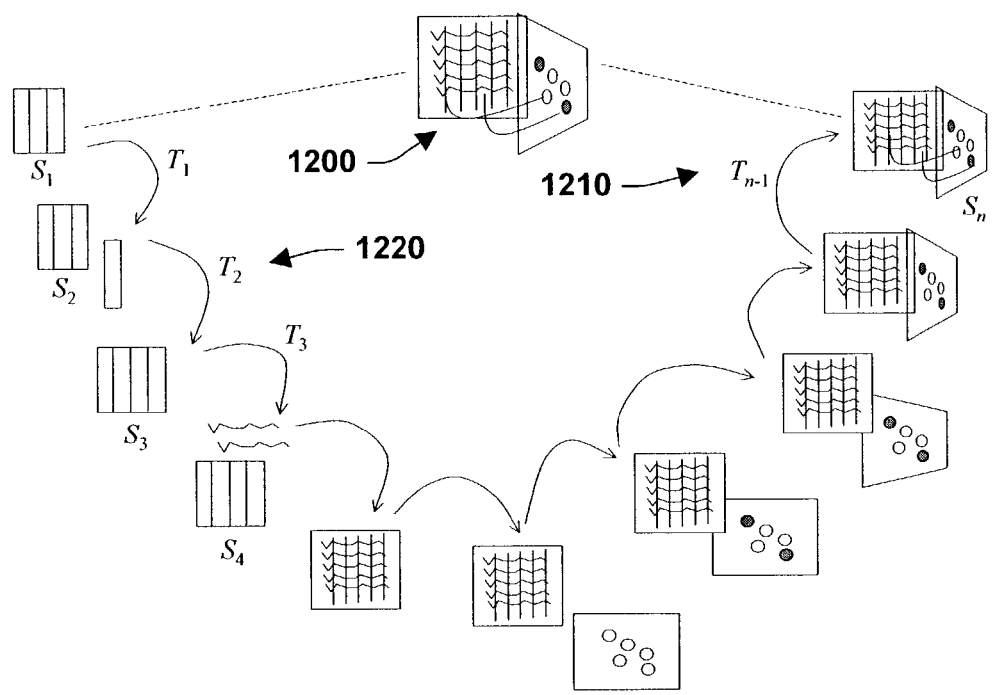
Figure 12:
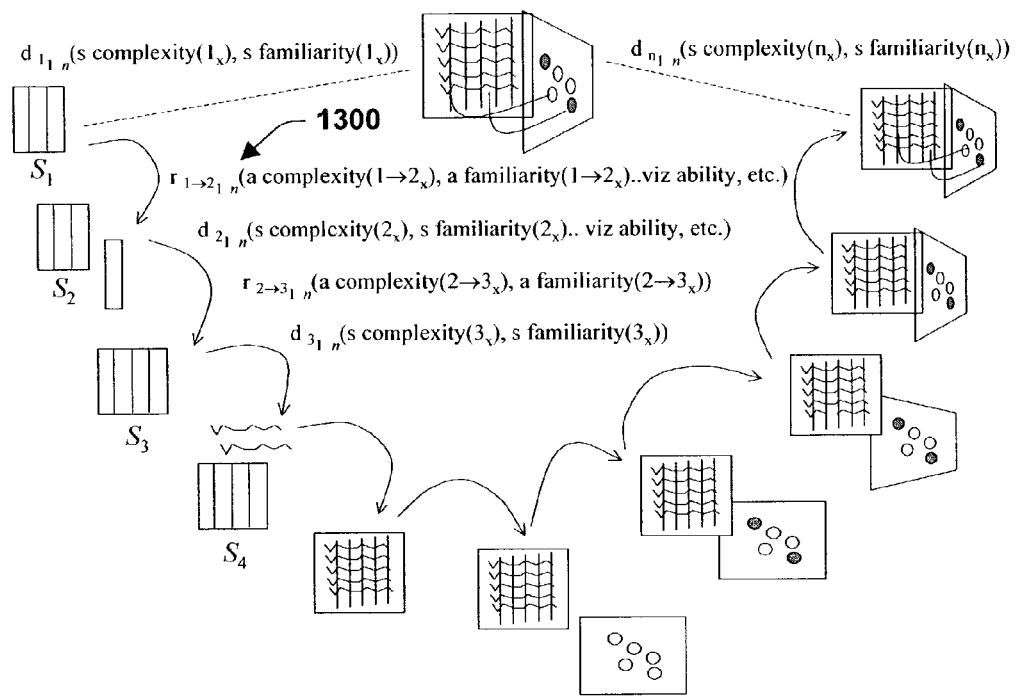

FIGS. 10 through 12, illustrate graphical sequences and processes for dynamically controlling sequences or visualizations of graphical output to the user based upon cognitive processing. It is to be appreciated that the following processes can also be employed with the systems and processes previously described, and can include interactions with other type applications (e.g., control presentation of audio data based upon cognitive determination, control sequence of mechanical/electrical output to user such as in a medical application applying stimulating controls).

In one aspect of the present invention, complex visualizations may be automatically tagged and identified in accordance with a decomposition procedure. For example, automated procedures can be provided that tag or identify portions of an application into a set of sub-problems via decomposition of a complete conceptual structure into a sequence of structures and associated transformations among the structures. Applications can be written that automatically provide sub-problem information as feedback to a cognitive processor (e.g., predetermined decompositions written into the applications). In another aspect, automated procedures may be applied to pre-existing applications or displays that automatically decompose a complex visualization problem into a set of sub-problems. This can include searching through a variety of abstractions (e.g., to find an appropriate set of sub-problems at a suitable level of abstraction to determine appropriately sized chunks for cognitive processing. Such a decomposition can be guided by considerations of natural clusters and break points in the overall complexity of the structure of the sub-problems and the complexity of the transformations among sub-problems that may be captured by animated transformations.

FIG. 10 illustrates an overview of a visualization process 1100. The process can include employment of simple or more sophisticated complexity metrics of structures of sub-problems and of transformations of animations (and/or sequences of display of static structures) that consider the number of objects 1110 and relations, and perhaps, additionally, a user's familiarity with visualizations or material, and the measures of complexity to derive suitable temporal sequencing, including application dwells and pace of animations illustrated over time at 1120.

In another aspect, given an existing essential decomposition of a visualization problem into a set of structures and a sequence of static or animated transformations among the structures at 1110, the process illustrated at 1100 includes controlling timing of dwells and rates of animation. This situation can be extended so that it is applied hierarchically, for example, as animations may entail a set of sub-animations and dwells on substructures created by such transformations.

The process illustrated at 1100 can also be employed to determine a set of sub-problems and transformations therein and consider dwells as a function of the complexity of the structure and rates of animation as a function of the complexity of the transformations, which can also be a function of the structures being modified. A number of reasonable measures of complexity can be determined. Such measures include functions of the number of distinct concepts or objects (e.g., as represented internally by nodes 1130 in a general graph representation of the visualization sub-problem or problem) and the number of relationships among the objects (e.g., as represented by arcs 1140 in a general graph representation of the problem).

FIG. 11 illustrates that a task of decomposition and serialization can focus on reformulating a conceptual challenge represented by a resultant, complex structure 1200 into a set of related sub-problems that can be composed into a target visualization 1210 through display of a sequence of visualization sub-problems illustrated at 1220. It is noted that animations depicted by the sequence at 1220 may be parameterized by variables that dictate dwells and viewing rates. The variables can also be useful for decomposing animations into distinct temporal phases for optimizing timing parameters. For example, it can be assumed that substantially all animations consist of a hierarchy of animations and dwells, consisting of one or more of the following animation phases and associated parameters:

a) Initial dwell: Initial "definitional" presentation of new visualization starting point;

b) Pace of transformation i: rate of transformations of relationship or view 1 . . . n;
c) Review dwell: Final review presentation;
d) Pace of preparation: Preparation for new transformation—can include such notions as a change in orientation of structure or viewpoint change, and so forth;

Other considerations can include collapsing visualization phases or sub-problems into a single animation that is controlled by a rate, or expanding these phases and parameters into more detailed phases and parameters.

FIG. 12 illustrates that automated control of display, animation, and dwell can include a task 1300 of assigning dwell times and rates of animation or revelation of sub-problems to respective sub-problems and transitions. Transitions can include multiple phases of dwell and animation as described above. Thus, parameters that dictate dwells and the rates of animation of sub-problems and sub-sub-problems, and so forth, can be hierarchically specified.

In addition to complete automation of dwell and pace of sub-problems or phases of sub-problems, users can specify whether aspects of a sequence are too fast or too slow (and thus frustrating to watch). Thus, in addition to automatic determinations, users can mediate timing decisions and give feedback via simple gestures (e.g., mouse controls, monitored eye movements, GUI controls) to control the rates at which transformation occur, including freezing, slowing down, and speeding up the pace of animations, and controlling the duration of dwells in-stream with an ongoing visualization sequence. Users can also be provided with user interfaces to indicate simple (or more involved) gestures to control decomposition, such as requesting a change in the number and rate of revelation of sub-problems. Input gestures can also be utilized for a pause and for a repeat of a transformation, for transforming the viewpoint, and/or for specially marking or scaling the size of all or selected components of a transformation. Special markers can be provided for objects or relationships—such as the use of text/object highlighting to facilitate visualization of the flow of objects, components, and/or relationships from one sub-problem to another or from an early sub-problem to a final rendering—answering such problems as "Where did this come from?," or "How did this get there?".

In yet another aspect of the present invention, controls can be provided in a polyarchy visualization to influence dwells, determine rates at which general animations occur, break animations into a set of phases, and/or individually control the rates at which the different phases of the animation occur with different parameters. For example, parameters can be provided for animation and dwell functions of the complexities and sub-complexities of different sub-problems. One approach is to provide a function that provides a measure of conceptual and/or visual complexity as a function of the number of objects and relations, or new objects and relations being introduced at a particular phase. User feedback can be employed to evaluate overall aesthetics, efficiency of comprehension of complex relationships, and user frustration with transformations that are too fast or too slow. Feedback data can be utilized to analyze how an ideal (or suitable) viewing rate is influenced by complexity.

The parameters, functions, and controls described above can also be adapted in accordance with other criteria. These criteria can include determining/computing that: Complexity of a visualization may be influenced positively by the number of objects and relationships among objects; Complexity of a visualization may be influenced negatively by a function of the familiarity of the user with objects and relations represented in the visualization; For measures of complexity and/or familiarity, identifying an effective complexity based on short-term or long-term memory considerations (short-term or long-term familiarity) of objects and structures; As the complexity of the structure and/or the transformation associated with an animation increases, considering it is valuable to slow the pace of the animation in a manner where the most complex transformations are associated with the slowest pace and vice versa; The duration of dwell on substructures can be diminished with growing familiarity within the substructure, in accordance with the complexity of the substructure; The pace of an animation can be quickened with user familiarity/experience in accordance with the complexity of a particular animation or sub-animation; The complexity of a transformation can be computed as a function of initial relationships in the structure being transformed, new objects being introduced, new relationships being introduced, the relationships being deleted (negative correlation), and the magnitude of the change in orientation of the object or user; Enhancing the effectiveness and satisfaction associated with visualizations by optimizing the duration of dwell on substructures and the pace of transformations; and increasing the pace, and perform frank chunking of subsequences of visualizations with familiarity.

CONCLUSION

Although specific aspects have been illustrated and described herein, it will be appreciated by those of ordinary skill in the art that any arrangement which is calculated to achieve the same purpose may be substituted for the aspects shown. This application is intended to cover any adaptations or variations of the present invention. Therefore, it is manifestly intended that this invention be limited only by the following claims and equivalents thereof.

What is claimed is:

1. A computer-implemented automated system for controlling applications, comprising:
    at least one model that is adapted to human cognitive processing capability; and
    a dwell component that receives results from the model to control a rate at which applications are performed.

2. The system of claim 1, further comprising an output to drive at least one of a graphical display, a text display, an audio output, and a mechanical output.

3. The system of claim 1, the applications include at least one of a service, a display, an e-mail, a calendar, desktop service(s), a desktop control, a web service, a browser, and animated display sequences that are executable by a computer.

4. The system of claim 1, the dwell component provides dwell controls that represent at least one of codes, flags, and signals related to timing data.

5. The system of claim 4, the dwell controls at least one of pause, delay, start, end, and at the applications.

6. The system of claim 4, further comprising a cognitive processor that processes user data to determine current user state information.

7. The system of claim 6, the cognitive processor executes the at least one model to process the user state information and provides data to the dwell component, the at least one model determines information relating to an ability to process information by a user.

8. The system of claim 6, the cognitive processor processes feedback from the application indicating at least one of a complexity, a number of objects, and object associations between objects, that are at least one of currently and about to be processed by the user.

9. The system of claim 6, the user data is derived from at least one of user inputs, a keyboard, a mouse, a microphone, a camera, an infrared detector, previous computer activities that are monitored over time, past applications employed, number of times the past applications have been accessed, and speed of interaction with a respective application.

10. The system of claim 9, the user inputs are employed to provide at least one of manual indications, selections, and adjustments to enable fine-tuning of the rate at which the applications are performed.

11. The system of claim 4, the dwell controls include at least one of formatting timer values, and controlling a signal in accordance with determined time values that are at least one of larger and smaller depending on cognitive capabilities of the user.

12. The system of claim 11, the dwell controls are dynamically according to at least one of determined cognitive capabilities of the user and feedback from the application.

13. The system of claim 1, the at least one model is adapted in part from the following expression:

$$C_T = f(C_{P1}, C_{P2} \ldots C_{PN})$$

wherein $C_T$ relates to a comprehension time, $f$ is a function, $C_P$ relates to cognitive parameters or variables, and N is an integer.

14. The system of claim 13, the at least one model is employed with at least one of a probability model, a Bayesian inference models, a Support Vector Machine (SVM), a Naive Bayes model, Bayes Net model, a decision tree model, a similarity-based model, and a vector-based model to determine cognitive capabilities of the user.

15. The system of claim 1, the at least one model is adapted in part from the following expression:

$$C_T = f(C_C, C_E, C_B, C_O)$$

wherein $C_C$ relates to a nature and complexity of items at a user's focus of attention, $C_E$ relates to an at least one of an environmental and a work context, $C_B$ relates to background knowledge of the user (e.g., can shorten dwell times in an animated visualization as the user may be familiar with the data structure), and $C_O$ relates to an overall competency of the user with regards to the item at the user's focus of attention.

16. A computer-implemented method to facilitate automated cognitive processing and control, comprising:
    determining at least one parameter associated with a cognitive function of a user; and
    controlling a tempo of an application based at least in part on the at least one parameter.

17. The method of claim 16, further comprising determining one or more user states, the states including at least one of whether the user is busy, having a conversation, how many applications are currently active, what of type applications are currently active, the user's goals and attentional resources.

18. The method of claim 16, providing feedback from the application indicating a complexity involved with a current application being accessed by the user.

19. The method of claim 16, further comprising determining a dwell based upon the at least one parameter.

20. The method of claim 19, further comprising automatically determining if a user's cognitive capabilities have changed over time and dynamically adjusting the dwell.

21. A computer-implemented method to facilitate dynamic visual processing, comprising:
- segmenting portions of an application into a set of sub-problems via a decomposition of a conceptual structure into a sequence of structures; and
- determining transformations among the structures, the portions of the application and the transformations relate to cognitive determinations for presentation to a user.

22. The method of claim 21, further comprising automatically providing information to the sub-problems as feedback to a cognitive processor.

23. The method of claim 21, further comprising searching through a variety of abstractions to select a set of the sub-problems at a level of abstraction to determine suitably sized chunks for cognitive processing.

24. The method of claim 23, further comprising determining at least one of natural clusters and break points in an overall complexity of a structure of the sub-problems and a complexity of the transformations among sub-problems that are captured by animated transformations.

25. The method of claim 21, further comprising determining a user's familiarity with a visualization, a presentation and a measure of complexity to derive a suitable temporal sequence.

26. The method of claim 21, further comprising controlling at least one of a dwell and a rate of an animation.

27. The method of claim 26, further comprising applying the at least one dwell and the rate hierarchically to a set of sub-animations.

28. The method of claim 26, further comprising at least one of determining the dwell as a function of a complexity of a structure and determining the rate of animation as a function of the complexity of a transformations.

29. The method of claim 21, further comprising determining a measure of complexity, the measure includes functions of at least one of a number of concepts, a number of objects, objects, and a number of relationships among the objects.

30. The method of claim 21, further comprising controlling an animation via at least one of:
- controlling an initial dwell;
- controlling a pace of transformation i, i being an integer; and
- controlling a rate of transformations of at least one of a relationship and a view 1 . . . n, n being an integer.

31. The method of claim 30, further comprising at least one of:
- providing a review dwell;
- providing a review presentation;
- controlling a pace of preparation; and
- preparing a new transformation including at least one a change in orientation of a structure and a viewpoint change.

32. The method of claim 30, further comprising at least one of:
- collapsing at least one of visualization phases and sub-problems into a single animation that is controlled by a rate; and
- expanding the phases and sub-problems into more detailed phases and sub-problems.

33. The method of claim 21, further comprising at least one of;
- enabling a user to control a speed of a visualization, the control including at least one of freezing, slowing down, and speeding up a pace of animations; and
- controlling a duration of dwells in-stream with an ongoing visualization sequence.

34. The method of claim 33, further comprising at least one of:
- receiving an input gestures to control at least one of a pause and a repeat of a transformation;
- transforming a viewpoint; and
- at least one of marking and scaling a size of a selected component of a transformation.

35. The method of claim 34, further comprising highlighting at least one of text and an object to facilitate visualization of at least one of a flow of objects, components, relationships from a first sub-problem to another sub-problem, and from a previous sub-problem to a final rendering.

36. The method of claim 21, further comprising analyzing feedback data to determine how a suitable viewing rate is influenced by complexity.

37. The method of claim 21, further comprising determining that a complexity of a visualization is influenced positively by a number of objects and relationships among objects.

38. The method of claim 21, further comprising determining that a complexity of a visualization is influenced negatively by a function of a familiarity of a user with objects and relations represented in a visualization.

39. The method of claim 21, further comprising identifying an effective complexity based on at least one of short-term and long-term memory considerations.

40. The method of claim 21, further comprising determining as a complexity of structure and a transformation associated with an animation increases, controlling a pace of the animation in a manner wherein more complex transformations are associated with a slower pace and less complex transformations are associated with a faster pace.

41. The method of claim 21, further comprising determining that a duration of dwell on a substructure can be diminished with growing familiarity within the substructure and in accordance with the complexity of the substructure.

42. The method of claim 21, further comprising computing a transformation complexity as a function of at least one of initial relationships in a structure being transformed, new objects being introduced, new relationships being introduced, the relationships being deleted (negative correlation), and a magnitude of change in orientation of an object.

43. The method of claim 21, further comprising enhancing an effectiveness and satisfaction associated with a visualization by optimizing at least one of a duration of dwell on a substructure, a pace of a transformations, increasing the pace, and performing frank chunking of subsequences of visualizations having familiarity.

* * * * *

UNITED STATES PATENT AND TRADEMARK OFFICE
CERTIFICATE OF CORRECTION

PATENT NO. : 6,999,955 B1  Page 1 of 2
APPLICATION NO. : 10/186135
DATED : February 14, 2006
INVENTOR(S) : Eric J. Horvitz It is certified that error appears in the above-identified patent and that said Letters Patent is hereby corrected as shown below:

On the Title page, in field (56), under "Other Publications", in column 2, line 2, delete "Measure." and insert -- Measure.... --, therefor.

Title page 2, in field (56), under "U.S. Patent Documents", in column 1, line 16, after "6,580,417" delete "B1" and insert -- B2 --, therefor.

Title page 2, in field (56), under "U.S. Patent Documents", in column 1, line 18, after "6,760,669" delete "B1" and insert -- B2 --, therefor.

Title page 2, in field (56), under "Other Publications", in column 1, line 2, delete "Apparatus." and insert -- Apparatus.... --, therefor.

Title page 2, in field (56), under "Other Publications", in column 1, line 4, delete "Assistant." and insert -- Assistant.... --, therefor.

Title page 2, in field (56), under "Other Publications", in column 1, line 6, delete "Assistant." and insert -- Assistant.... --, therefor.

Title page 2, in field (56), under "Other Publications", in column 1, line 8, delete "Assistant." and insert -- Assistant.... --, therefor.

Title page 2, in field (56), under "Other Publications", in column 1, line 10, delete "Assistant." and insert -- Assistant.... --, therefor.

Title page 2, in field (56), under "Other Publications", in column 1, line 11, delete "et al," and insert -- et al., --, therefor.

Title page 2, in field (56), under "Other Publications", in column 1, line 15, delete "et al," and insert -- et al., --, therefor.

Title page 2, in field (56), under "Other Publications", in column 2, line 10, delete "vs" and insert -- vs. --, therefor.

Title page 2, in field (56), under "Other Publications", in column 2, line 55, after "Spreitzer" insert -- , --.

UNITED STATES PATENT AND TRADEMARK OFFICE
CERTIFICATE OF CORRECTION

PATENT NO. : 6,999,955 B1
APPLICATION NO. : 10/186135
DATED : February 14, 2006
INVENTOR(S) : Eric J. Horvitz It is certified that error appears in the above-identified patent and that said Letters Patent is hereby corrected as shown below:

In column 3, line 60, after "invention" delete "." and insert -- ; --, therefor.

In column 3, line 64, after "invention" delete "." and insert -- ; --, therefor.

In column 6, line 29, after "thereof" insert -- , --.

In column 8, line 26, delete "inaction｜action" and insert -- inaction | action --, therefor.

In column 8, line 28, delete "approval｜automatic" and insert -- approval | automatic --, therefor.

In column 15, line 15, delete "processing." and insert -- processing). --, therefor.

In column 17, line 57, in Claim 5, after "and" delete "at" and insert -- restart --, therefor.

In column 20, line 4, in Claim 33, after "one of" delete ";" and insert -- : --, therefor.

Signed and Sealed this

Twenty-second Day of September, 2009

David J. Kappos
*Director of the United States Patent and Trademark Office*